Oct. 3, 1933.  E. H. PECKINPAUGH  1,929,151
FISH LURE
Filed Feb. 10, 1930

INVENTOR
E.H.Peckinpaugh
BY
ATTORNEYS

Patented Oct. 3, 1933

1,929,151

UNITED STATES PATENT OFFICE 1,929,151

FISH LURE

Ernest H. Peckinpaugh, Chattanooga, Tenn.

Application February 10, 1930. Serial No. 427,292

1 Claim. (Cl. 43—48)

This invention relates to fly lures of the type used in casting, and, among other objects, aims to provide an improved, attractive and relatively inexpensive lure of this character in which the hooks are arranged in tandem not only materially to increase the possibility of hooking a striking fish, but also to make possible the securing of separate and distinct artificial flies or insects to the respective hook shanks in tandem or one behind the other, thereby simulating one chasing the other, this arrangement giving a very attractive and appetizing appearance to game fish.

This invention involves certain important improvements on that type of fly lure disclosed in my Patent No. 1,781,598, dated November 11, 1930.

In the accompanying drawing.

Many of the insects upon which game fish feed have a habit of following each other very closely over the water when they are mating and thus neglect their instinctive precautions to avoid the danger of being caught. Game fish seem to be aware of this fact and pursue such insects very vigorously and with both appetizing and satisfying results. It is, therefore, an aim of this invention to produce an improved artificial fly lure which closely simulates such mating flies or insects and is very attractive to game fish.

Figure 1:
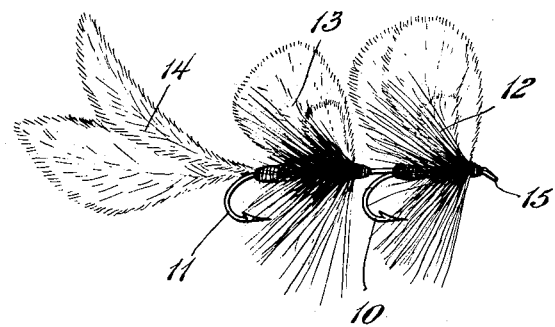
Fig. 1 is a side elevation of a fly lure embodying the invention.

Referring to Fig. 1, the lure there shown comprises a front hook 10 and a rigidly connected rear hook 11 both preferably, though not necessarily, lying in the same plane and separate flies 12 and 13 are tied or otherwise secured to the hook shanks, a tuft of tail feathers 14 being conveniently connected to project rearwardly from the rear hook so as to help conceal it. The lures may be made of feathers or hair or a combination of feathers and hair and various other well known materials to simulate a great variety of insects. Herein, they are arranged to float upright on the water, both hooks hanging downwardly and acting as weights.

Figure 2:
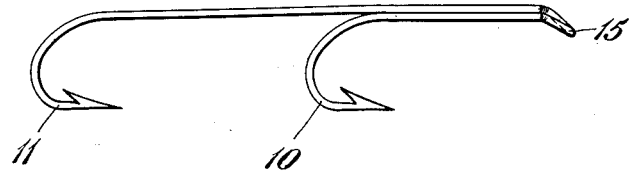
Fig. 2 is a side elevation showing the preferred construction and arrangement of the tandem hooks.
Figure 3:
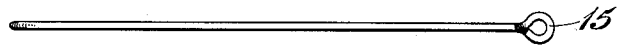
Fig. 3 is a top plan view of the tandem hooks.

In Fig. 2 the hooks are shown as being made of a single or continuous piece of wire for the sake of rigidity and also economy in manufacture. The shank of the front hook 10 is there reversely bent to form an eye 15 and an elongated shank for the rear hook 11 lying in the plane of the front hook. The eye 15 is preferably so bent that it projects forwardly and downwardly at an acute angle to the horizontal and lies in a plane at right angles to the plane of the hooks. Thus, the eye simulates the flat head on the front insect. The integral hooks provide a much stronger and more rigid construction than other types of hooks and since they lie in substantially the same plane the chances of hooking a striking fish are materially enhanced.

The front fly 12 is here shown as being tied to both shanks and covering practically all of the front shank; while the rear fly 12 is tied to the elongated shank of the rear hook 11 so as to conceal practically all of it. The wrapping for the front fly serves also to secure the shanks together and prevent them from bending away from each other, thus obviating the necessity to braze or solder them. It has been found that brazing or soldering often destroys the temper of the steel and promotes breakage.

While the tandem fly lures are here shown as being substantially identical, it will be understood that their appearance and design may be widely varied. Moreover, in some instances, it is contemplated that a single elongated insect may advantageously be utilized on the improved tandem hooks.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

A fish lure of the character described, comprising, in combination, a pair of rigidly connected tandem hooks arranged in substantially the same plane, and made from a single piece of wire bent to form an eye connecting the hook shanks, said eye being so bent that it projects forwardly and downwardly when the hook shanks are horizontal and lies in a plane substantially at right angles to the plane of the hooks to simulate the head of an insect; an artificial fly on the front hook securing both shanks together behind the eye; and an artificial fly secured to the shank of the rear hook behind the first mentioned fly to imitate one fly chasing the other when the hooks are drawn along the water; the bills of both hooks being directed downwardly and acting as weights to keep the flies upright on the surface of the water.

ERNEST H. PECKINPAUGH.